US012418744B2

(12) United States Patent
Aboud et al.

(10) Patent No.: US 12,418,744 B2
(45) Date of Patent: Sep. 16, 2025

(54) SPEAKER WITH SOUND DISPERSING CONE

(71) Applicant: Roswell U.S. LLC., Rockledge, FL (US)

(72) Inventors: Stephen Aboud, Cocoa Beach, FL (US); Colin Brumbaugh, Merritt Island, FL (US); Carter Lankes, Merritt Island, FL (US); Darrick Wilson, Edmonton (CA)

(73) Assignee: Roswell U.S., LLC, Rockledge, FL (US)

( * ) Notice: Subject to any disclaimer, the term of this patent is extended or adjusted under 35 U.S.C. 154(b) by 204 days.

(21) Appl. No.: 18/239,246

(22) Filed: Aug. 29, 2023

(65) Prior Publication Data

US 2025/0080903 A1 Mar. 6, 2025

(51) Int. Cl.
*H04R 1/34* (2006.01)

(52) U.S. Cl.
CPC .................................... *H04R 1/345* (2013.01)

(58) Field of Classification Search
CPC ...................................................... H04R 1/345
USPC .......................................................... 381/339
See application file for complete search history.

(56) References Cited

U.S. PATENT DOCUMENTS 2,271,100 A 1/1942 Scott
2,820,525 A * 1/1958 Fountain ................ H04R 1/345
181/187
3,326,321 A 6/1967 Valuch
3,329,235 A 7/1967 Shaper
3,816,672 A 6/1974 Gefvert
4,348,549 A 9/1982 Berlant
4,620,317 A 10/1986 Anderson
5,115,882 A 5/1992 Woody
5,129,006 A 7/1992 Hill
5,131,052 A 7/1992 Hill
5,525,767 A 6/1996 Fields
5,673,329 A * 9/1997 Wiener .................... H04R 1/34
381/89
5,721,401 A 2/1998 Sim
5,988,314 A 11/1999 Negishi
6,996,243 B2 2/2006 Welker
8,098,852 B2 1/2012 Harwood
9,226,058 B2 12/2015 Harwood
10,129,636 B2 11/2018 Kim
(Continued)

*Primary Examiner* — Sean H Nguyen

(74) *Attorney, Agent, or Firm* — Timothy H. Van Dyke; WOLTER, VAN DYKE, DAVIS PLLC

(57) ABSTRACT

An apparatus (100), including: a speaker (152, 154); a baffle (104) surrounding the speaker; and a dispersion cone (106) positioned forward of, aligned with, and pointing toward the speaker and having a dispersion surface (120) with: a dispersion surface central section (122); a dispersion surface surrounding section (124) therearound; and a transition (126) therebetween. From a tip (122T) of the dispersion cone outward the dispersion surface central section defines a concave cross-sectional shape (170), the dispersion surface surrounding section defines a less concave cross-sectional shape (172) than the concave cross-sectional shape of the dispersion surface central section, and the transition comprises an inflection point (124IP). A distance of each section of the dispersion surface forward of the speaker progressively increases with increasing radial distance from a radial center of the dispersion surface.

19 Claims, 10 Drawing Sheets

(56) References Cited

U.S. PATENT DOCUMENTS

| | | | | |
|---|---|---|---|---|
| 11,317,183 | B2 | 4/2022 | Shen | |
| 11,395,063 | B2 * | 7/2022 | Wang | G10K 11/28 |
| 2002/0011379 | A1 | 1/2002 | Taylor | |
| 2003/0141142 | A1 | 7/2003 | Christiansen | |
| 2005/0093970 | A1 | 5/2005 | Abe | |
| 2012/0076328 | A1 | 3/2012 | Harwood | |
| 2016/0227315 | A1 | 8/2016 | Kim | |
| 2016/0337748 | A1 | 11/2016 | Goksel | |
| 2017/0006376 | A1 | 1/2017 | Tan | |
| 2018/0242061 | A1 | 8/2018 | Honda | |
| 2019/0121405 | A1 | 4/2019 | Pennington, Jr. | |
| 2020/0280797 | A1 | 9/2020 | Combest | |

* cited by examiner

SPEAKER WITH SOUND DISPERSING CONE

FIELD OF THE INVENTION

The invention relates to a speaker having a dispersion cone to redirect sound.

BACKGROUND OF THE INVENTION

Dispersion cones are used on speakers, such as those mounted to a tower on a boat, to redirect sound emanating from a tweeter in an outward direction. However, in this context, known dispersion cone assemblies do not redirect the sound from other speaker elements such as a woofer and the like. In addition to diffusing only a portion of the sound from the speaker, the coverage area of the sound that is redirected is limited. Moreover, the dispersion cone itself and its supporting structure may interfere with the sound stage. Consequently, there is room for improvement in the art.

BRIEF DESCRIPTION OF THE DRAWINGS

The invention is explained in the following description in view of the drawings that show.

DETAILED DESCRIPTION OF THE INVENTION

The present Inventors have developed an improved speaker assembly with a sound dispersion cone ideally suited for mounting to a tower of a boat. The sound dispersion cone distributes sound from the entire speaker evenly over 360 degrees for listeners located around the speaker. In addition, the sound dispersion cone is sufficiently acoustically transparent to pass sound through to listeners located in front of the speaker. This is ideal for a boat tower mounted speaker that is aimed downward because boat passengers are often spread out around and below the speaker. The improved speaker assembly enables everyone to enjoy a more uniform sound presentation regardless of their location on the boat. Moreover, changes in the sound presentation resulting from moving around the boat are minimized.

The speaker assembly achieves the improved sound distribution via a unique arrangement in which the dispersion cone cooperates with the speaker housing to distribute the full range of sound emanating from the speaker. This is done by positioning the dispersion cone in front of all the speaker elements (not just the tweeter). An example arrangement includes a speaker having a concentrically positioned tweeter and woofer assembled together with a dispersion cone. The dispersion cone is positioned concentric with and in front of the tweeter and woofer and is large enough in diameter to receive and redirect all sound emanating from both the tweeter and the woofer. Sound from the speaker is immediately redirected radially by one portion of the dispersion cone, and sound is redirected back to the speaker housing and then redirected radially and forward by another portion of the dispersion cone.

In addition, the dispersion cone is configured to act as a passive radiator and pass sound therethrough. Together, the distributed sound and the radiated sound present a more uniform sound presentation for all listeners.

Figure 1:
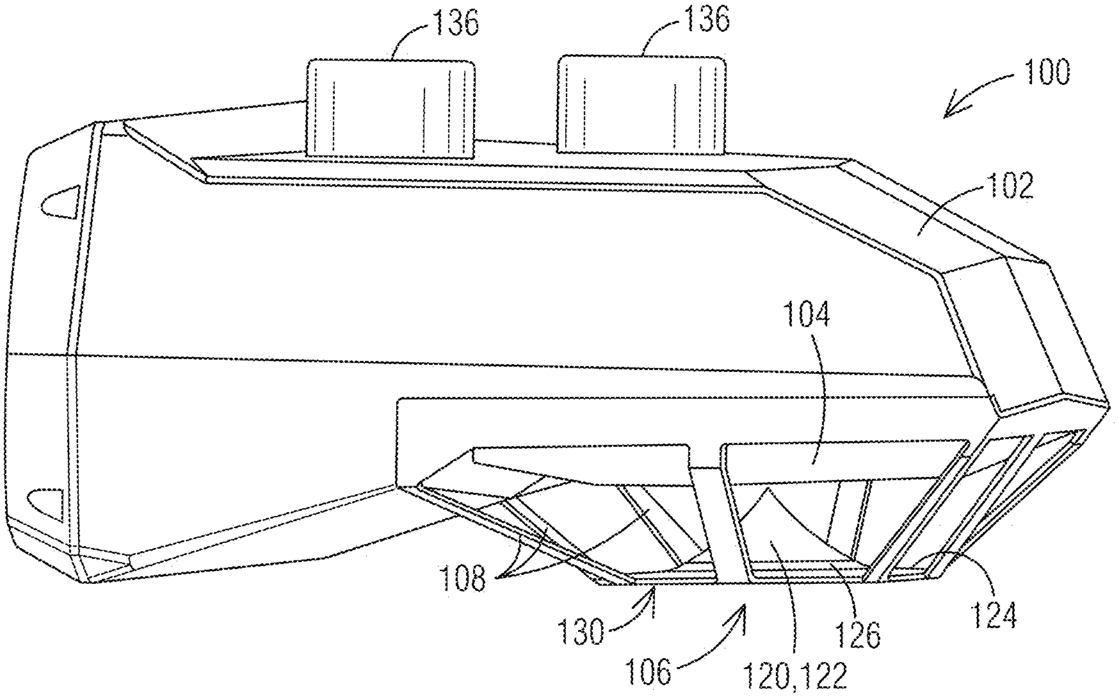
FIG. 1 is a side view of an example embodiment of a speaker assembly.
Figure 2:
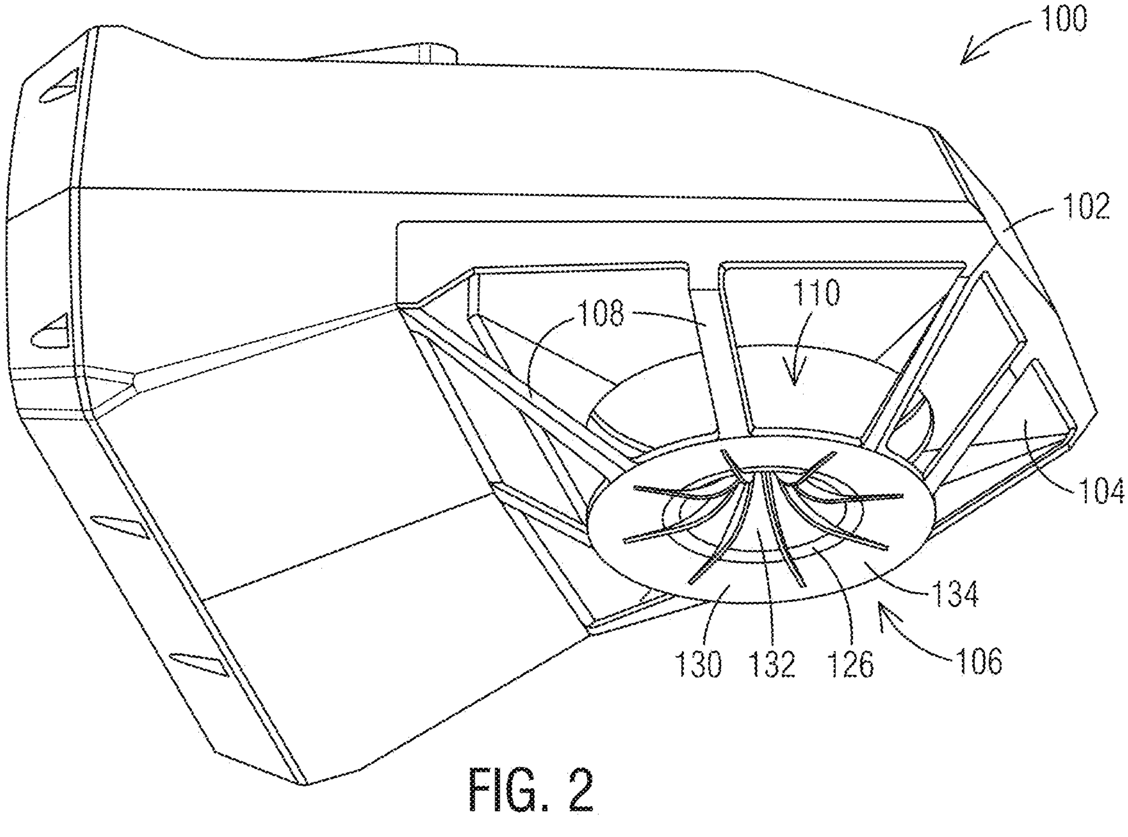
FIG. 2 is a lower perspective view of the speaker assembly of FIG. 1.
Figure 3:
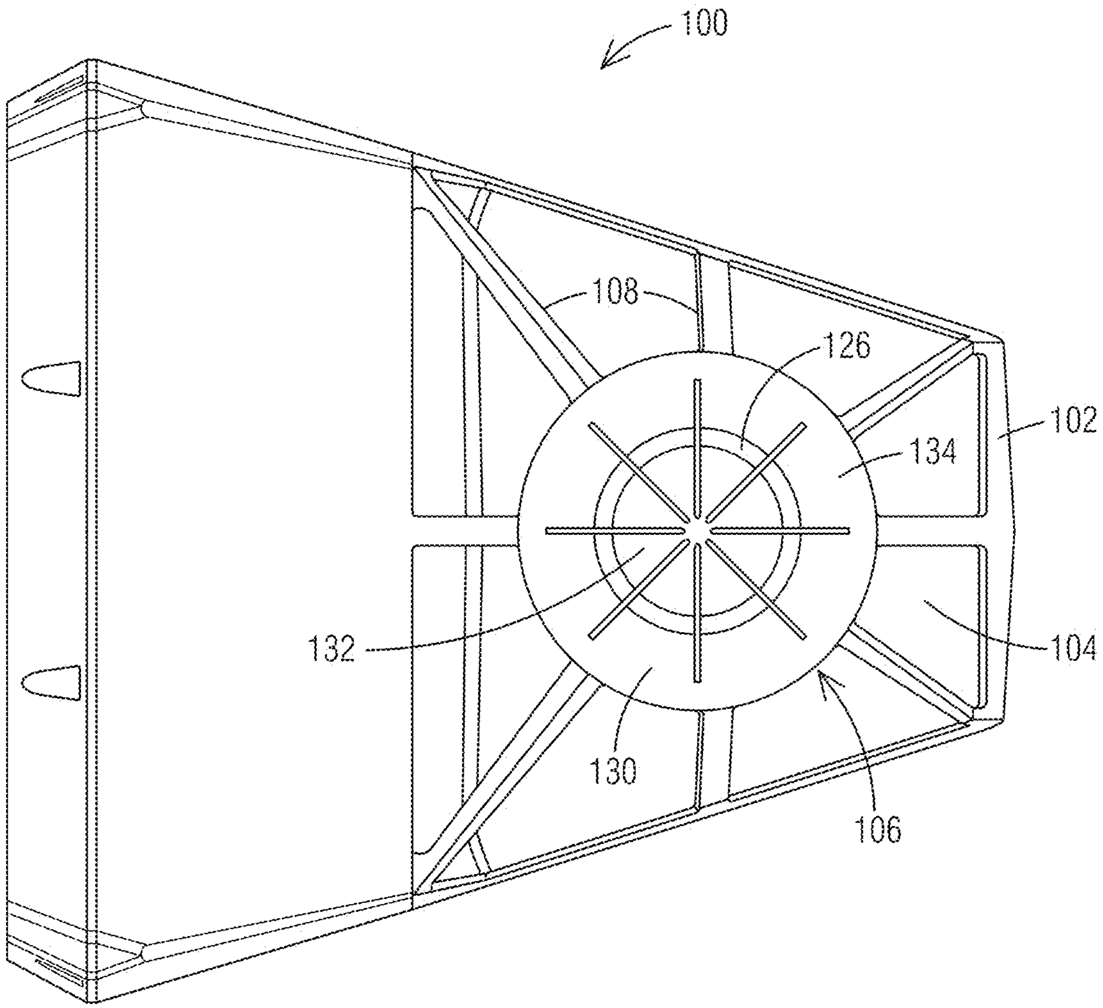
FIG. 3 is a bottom view of the speaker assembly of FIG. 1.

FIG. 1 to FIG. 3 are views of an example embodiment of a speaker assembly 100 having a speaker housing 102, a baffle 104, a dispersion cone 106, and ribs 108 connecting the dispersion cone 106 to the baffle 104 (or optionally to the speaker housing 102), and a speaker housing opening 110 in which a speaker (not shown in FIG. 1 to FIG. 3) is positioned.

The dispersion cone 106 is positioned forward of, is aligned with, and points toward the speaker. The dispersion cone 106 includes dispersion surface 120 having a dispersion surface central section 122, a dispersion surface surrounding section 124 therearound, and a dispersion cone transition 126 therebetween.

The dispersion cone 106 further includes a forward-facing radiating surface 130 having a radiating surface central section 132 that defines a concave overall shape, a radiating surface surrounding section 134 that surrounds the radiating surface central section 132, and the dispersion cone transition 126 therebetween.

In an example embodiment, the radiating surface central section 132 corresponds to the dispersion surface central section 122, though this is not necessary. Corresponds means that the radiating surface central section 132 defines a concave overall shape and is disposed inside the dispersion surface central section 122, which defines a convex overall shape. Corresponding may further mean that the radiating surface central section 132 has a shape that matches a shape of the dispersion surface central section 122. Such may be the case when the dispersion cone 106 has a uniform thickness between the radiating surface central section 132 and the dispersion surface central section 122.

In an example embodiment, the radiating surface surrounding section 134 corresponds to the dispersion surface surrounding section 124, though this is not necessary. Corresponds means that the radiating surface surrounding section 134 has a shape that matches a shape of the dispersion surface surrounding section therearound 124. Such may be the case when the dispersion cone 106 has a uniform thickness between the radiating surface surrounding section 134 and the dispersion surface surrounding section 124.

In an example embodiment, the respective shapes/curves defined by the dispersion surface central section 122 and the dispersion surface surrounding section 124 are different from each other. The dispersion cone transition 126 connects the two. The dispersion cone transition 126 may be a gentle curve that smoothly connects the shapes/curves defined by the dispersion surface central section 122 and the dispersion surface surrounding section 124. Alternately, the dispersion cone transition 126 may be as abrupt as fabrication allows.

Speaker assembly mounts 136 permit easy mounting of this example speaker to a tower on, for example, a boat. Such a mount aims the speaker downward. When so mounted, the dispersion surface central section 122 directs sound laterally (radially outward), the dispersion surface surrounding section 124 cooperates with the baffle 104 to direct the sound laterally and downward (forward), and the dispersion cone 106 also radiates sound therethrough downward.

Figure 4:
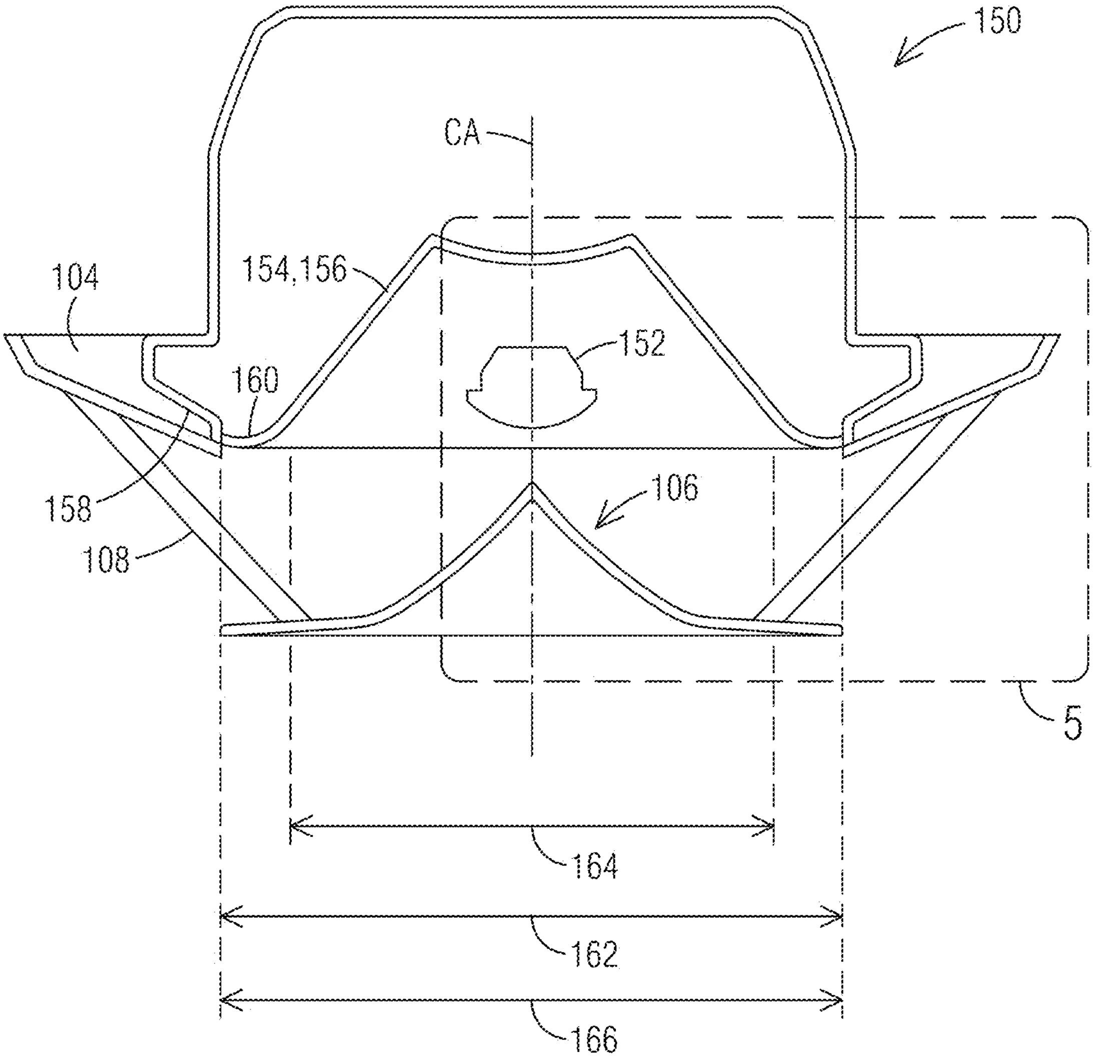
FIG. 4 is a side sectional view of select components of the speaker assembly of FIG. 1.

FIG. 4 is a sectional view of select components of the speaker assembly 100 of FIG. 1. Visible are the speaker 150, the baffle 104, a tweeter 152, a woofer 154 having a woofer cone 156, a speaker frame 158, and a surround 160 between the woofer cone 156 and the speaker frame 158. Also shown are the dispersion cone 106 and ribs 108 connecting the dispersion cone 106 to the baffle 104. In this example, the tweeter is a driver and the woofer 154 is a second driver, but there can be any number of drivers. Some, all, or none of the number of drivers may be concentrically aligned. Alternately, the speaker 150 may include a single, full (frequency) range driver.

The tweeter 152, the woofer 154, and the dispersion cone 106 are all concentric with a central axis CA. In this example embodiment, an outer diameter 162 of the dispersion cone 106 is at least as large as an outer diameter 164 of the woofer cone 156, although this is not necessary. In this example embodiment, the outer diameter 162 of the dispersion cone 106 is also at least as large as an outer diameter 166 of the surround 160. Hence, in the example embodiment, the outer diameter 162 of the dispersion cone 106 is at least as large as an outer diameter of all moving components of the speaker 150, namely the tweeter 152, the woofer cone 156, and the surround 160. This allows for very effective dispersion of the sound from the speaker 150. In alternate embodiments, the outer diameter 162 of the dispersion cone 106 may be larger than, smaller than, or equal to the outer diameter 164 of the woofer cone 156 or larger than, smaller than, or equal to the outer diameter 166 of the surround 160.

Figure 5:
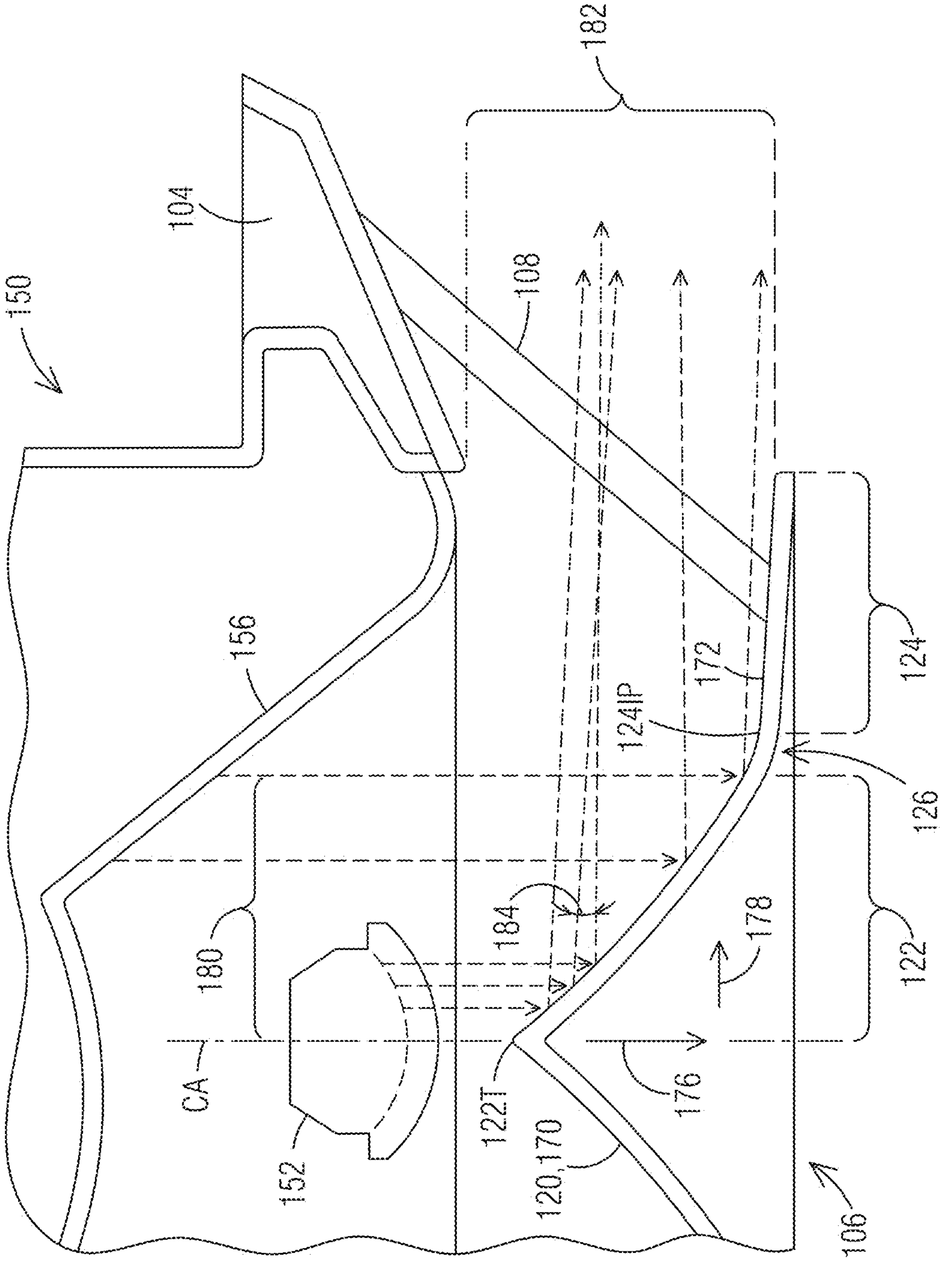
FIG. 5 is a closeup view of the sectional view of FIG. 4.

FIG. 5 is a closeup view of the sectional view of FIG. 4. As can be seen in FIG. 5, the dispersion surface central section 122 has a convex (conical pointed) overall shape. However, in this side sectional view, from a tip 122T of the dispersion cone 106 and moving in the forward direction 176 and the radial direction 178, the dispersion surface central section 122 defines a concave cross-sectional shape 170. Due to the various vibration modes occurring across the surface of a speaker, certain frequencies will tend to be strongest at certain locations of a speaker cone. Generally speaking, higher frequencies are stronger towards the center of the cone and lower frequencies get stronger towards the perimeter. The shape of the dispersion cone 106 is such that it attempts to capture these frequencies at their strongest point and redirect them in the same general direction while providing an equal (or as close to equal as possible) length signal path through the air to the listener's ear. This is critical in minimizing comb filtering, which is the result of certain frequencies arriving out-of-phase relative to the remainder of the intended audio signal, resulting in unwanted peaks and dips in the perceived sound.

In this side sectional view and moving in the forward direction 176 and the radial direction 178, moving from a radially inner perimeter 124IP of the dispersion surface surrounding section 124 outward, the dispersion surface surrounding section 124 defines a less concave cross-sectional shape 172 than the cross-sectional shape 170 of the dispersion surface central section 122. In the example embodiment shown, the cross-sectional shape 172 of the dispersion surface surrounding section is linear (flat).

Both the dispersion surface central section 122 and the dispersion surface surrounding section 124 progressively increase their distance in the forward direction 176 from the speaker 150 with increasing distance in the radial direction 178. In other words, both sections progressively taper away from the speaker 150 with increasing radial distance from the central axis CA. These tapers allow for radial dispersion of the sound waves impacting the tapered sections.

The cross-sectional shape 170 of the dispersion surface central section 122 is configured to redirect sound waves emanating from a central region 180 of the (drivers of the) speaker 150 radially outward and through an annular opening 182 between the baffle 104 and the dispersion surface surrounding section 124. For sake of simplicity, sound waves are illustrated herein as dashed streamlines that originate at the moving parts (drivers) of the speaker 150 (the tweeter 152, the woofer 154, and the surround 160) and travel in the forward direction 176 until encountering the dispersion surface 120. In an example embodiment, a local curvature of the cross-sectional shape 170 may be tied to distance in the radial direction 178 from the central axis CA. As the radial distance increases, the shape transitions from having a more vertical slope to having a more horizontal slope. This may be necessary to ensure the redirected sounds of the central region 180 bypass the dispersion surface surrounding section 124 and pass directly through the annular opening 182 without encountering any other surface such as the dispersion surface surrounding section 124.

In an example embodiment, the shape of the dispersion surface central section 122 is further configured to redirect all the sound waves emanating from the central region 180 of the (drivers of the) speaker 150 in the same radial direction and/or within a certain angular envelope. For example, the cross-sectional shape 170 may be configured so that an angle 184 between any two redirected central region streamlines 186 may be less than a threshold value.

Figure 6:
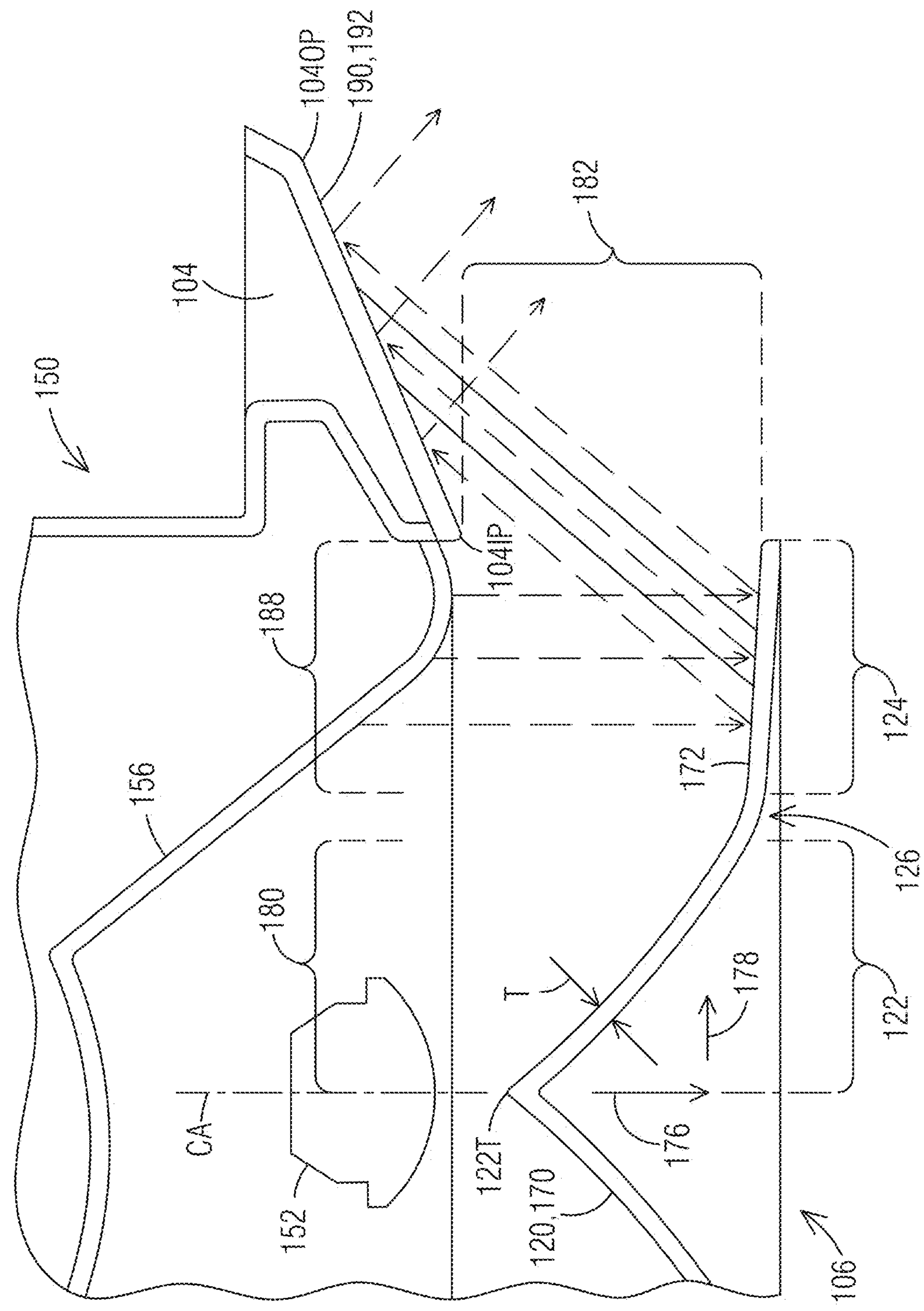
FIG. 6 is another closeup view of the sectional view of FIG. 5.

FIG. 6 is another closeup view of the sectional view of FIG. 4 and shows sound streamlines emanating from a peripheral region 188 of the (drivers of the) speaker 150. The dispersion surface surrounding section 124 is configured to receive the sound emanating from the peripheral region 188 and to redirect it radially outward and back toward the baffle 104. The baffle 104, in turn, further redirects the sound radially outward and forward (downward).

In this side sectional view and moving in the radial direction 178 from a radially inner perimeter 104IP to a radially outer perimeter 104OP, a cross sectional shape 190 of a baffle reflecting surface 192 of the baffle 104 may be concave to focus the sound within a narrower radial distance, convex to disperse the sound over a greater radial distance, or straight (as is shown in FIG. 6). In addition, the orientations/angles of the dispersion surface surrounding section 124 and the baffle reflecting surface 192 may be adjusted to best target the redirected sound to certain radial locations etc.

In an example embodiment, the shape of the dispersion surface central section 122, the cross-sectional shape 172 of the dispersion surface surrounding section 124, and the surface of the dispersion cone transition 126 therebetween are all free of convex shapes. In such an example embodiment, such as that shown, the cross-sectional shape of the entire dispersion surface 120 is free of convex shapes.

The dispersion cone 106 itself is configured to act as a passive radiator to radiate sound waves impacting the dispersion surface 120 from the forward-facing radiating surface 130 and directly to the surrounding environment. The sound radiated by the dispersion cone 106 will best reach listeners disposed directly forward of (under) the speaker.

The dispersion cone 106 is configured to resonate with the sounds impacting the dispersion surface 120. Resonation is enabled by securing the ribs 108 to the outermost periphery of the dispersion cone 106. The dispersion cone 106 is then akin to a cone of a speaker, and the ribs 108 act somewhat like a speaker surround. This restraint of the periphery alone allows the dispersion cone 106 freedom to move/resonate and thereby transmit sound as a passive radiator. A suitable dispersion cone 106 may be thin with a lower mass/inertia.

The dispersion cone itself may also be at least partly composed of a material that is acoustically transparent. Such materials will allow sound waves to travel through the dispersion cone 106 with little loss of sonic quality.

Materials selected for the dispersion cone 106 should be suitably reflective so that sound impacting the dispersion surface 120 are properly dispersed/reflected as disclosed above. The materials should also be suitably resilient so that the dispersion cone 106 can resonate as disclosed above. The materials may also have a degree of acoustic transparency. Such a material should be structurally homogenous to allow the material to vibrate consistently throughout its shape across a broad frequency range, as well as lightweight enough to allow sound traveling through the air between the woofer 154/tweeter 152 and the dispersion cone 106 to be sufficient to generate such vibrations. The surface of the material should also be sufficiently dense and smooth enough to reflect sound outward. Finally, the material should have sufficient internal damping that it does not continue to resonate once a force is no longer being applied. These combined requirements could be fulfilled by a range of materials. Given the additional requirements of being on a boat, being cost effective, water resistant, and durable, in an example embodiment the dispersion cone 106 is formed of injection-molded polypropylene.

In an example embodiment, the dispersion cone transition 126 may be thinned and/or made of a relatively more flexible material relative to a thickness between the radiating surface central section 132 and the dispersion surface central section 122 and/or between the radiating surface surrounding section 134 and the dispersion surface surrounding section 124. The dispersion cone transition 126 may then act like a speaker surround and allow the radiating surface central section 132 to resonate more freely relative to the radiating surface central section 132.

The ribs 108 are configured to present as small a profile as possible to the redirected sound. In addition, the ribs 108 may be composed of a relatively flexible material. Such a flexible material may flex and thereby provide greater freedom of movement for resonation of the dispersion cone 106. For many of the same reasons injection-molded polypropylene is suitable for the dispersion cone 106, injection-molded polypropylene is also suitable for the ribs 108.

Figure 7:
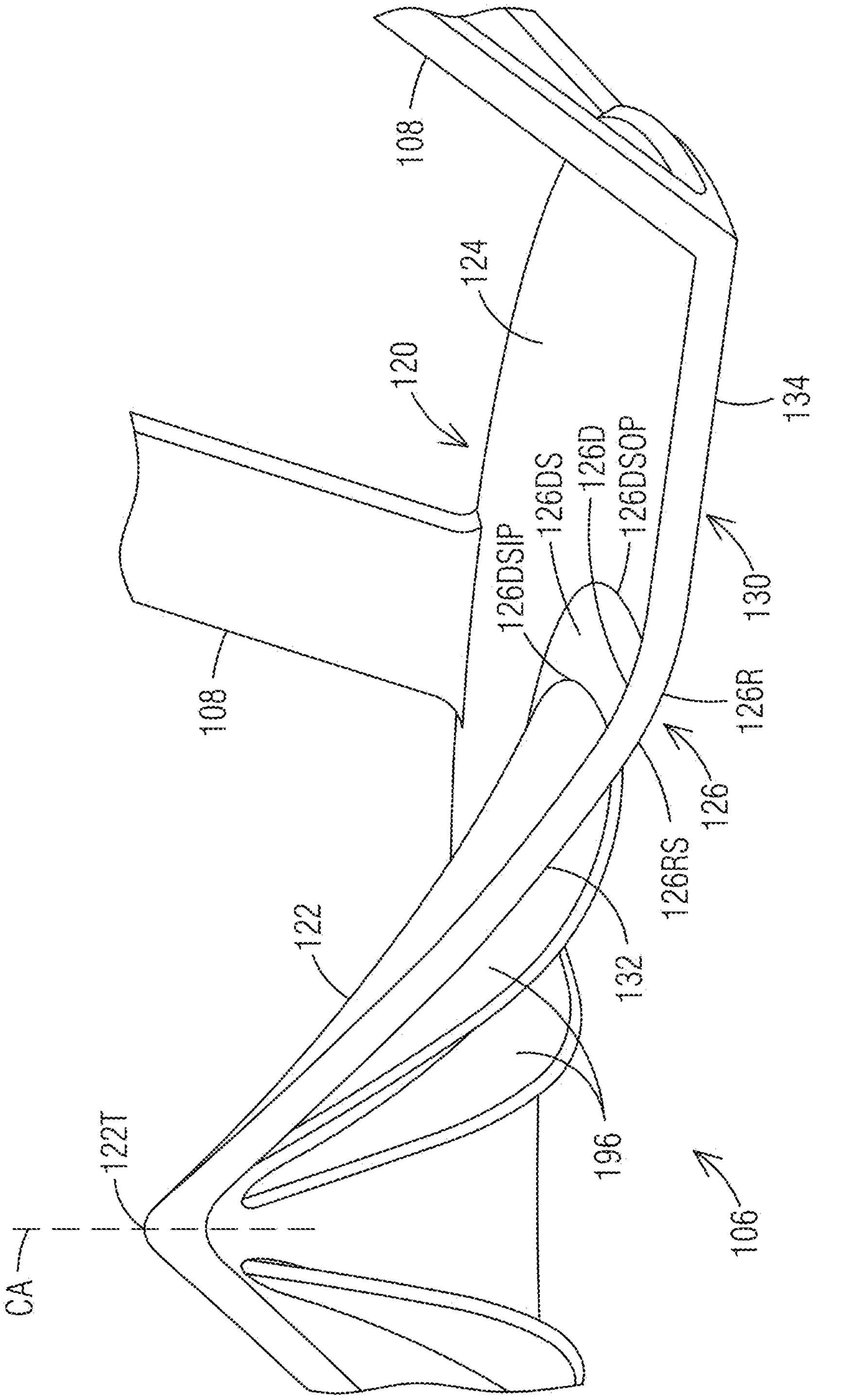
FIG. 7 is an elevated perspective and sectional closeup view of an example embodiment of a dispersion cone.
Figure 8:
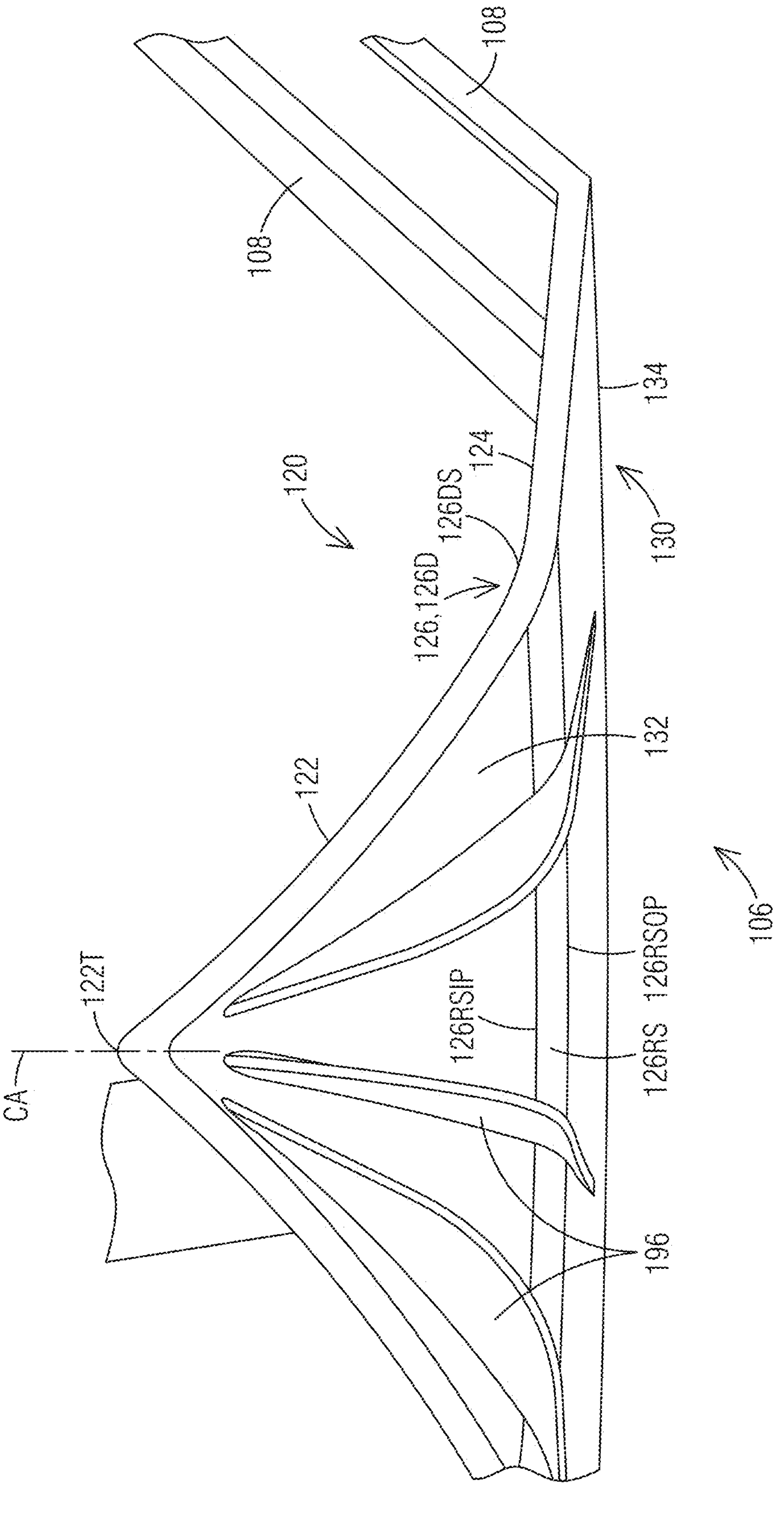
FIG. 8 is a lower perspective and sectional closeup view of an example embodiment of a dispersion cone.

FIG. 7 and FIG. 8 show sectional views of the dispersion cone 106. Visible are the dispersion surface 120, the dispersion surface central section 122, the dispersion surface surrounding section 124, the dispersion cone transition 126, and a dispersion side inflection point 126D defined by a dispersion side surface 126DS of the dispersion cone transition 126. Also visible are the forward-facing radiating surface 130, the radiating surface central section 132, the radiating surface surrounding section 134, the dispersion cone transition 126, and a radiating side inflection point 126R defined by a radiating side surface 126RS of the dispersion cone transition 126. Optional reinforcing ribs 196 help maintain a shape of the dispersion cone 106.

The example dispersion cone transition 126 shown includes a dispersion side radially inner perimeter 126DSIP that indicates a boundary between a smooth cross-sectional shape of the dispersion surface central section 122 and the smooth cross-sectional shape of the dispersion side surface 126DS of the dispersion cone transition 126. The example dispersion cone transition 126 also shows a dispersion side radially outer perimeter 126DSOP that indicates a boundary between a smooth cross-sectional shape of the dispersion side surface 126DS of the dispersion cone transition 126 and a smooth cross-sectional shape of the dispersion surface surrounding section 124.

The example dispersion cone transition 126 shown includes a radiating side radially inner perimeter 126RSIP that indicates a boundary between a smooth cross-sectional shape of the radiating surface central section 132 and the smooth cross-sectional shape of the radiating side surface 126RS of the dispersion cone transition 126. The example dispersion cone 126 transition also shows a radiating side radially outer perimeter 126RSOP that indicates a boundary between a smooth cross-sectional shape of the radiating side surface 126RS of the dispersion cone transition 126 and a smooth cross-sectional shape of the radiating surface surrounding section 134.

Figure 9:
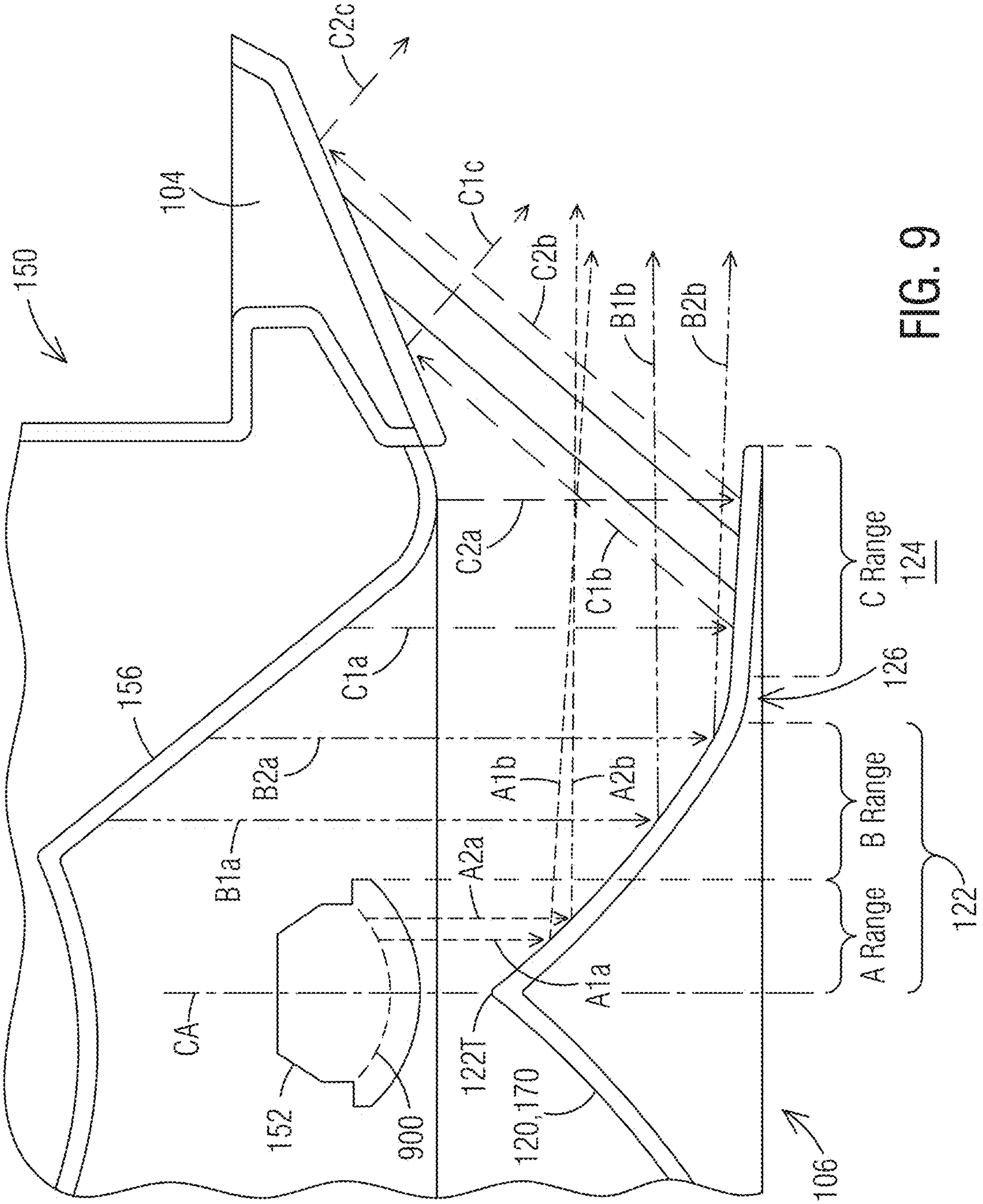
FIG. 9 is another closeup view of the sectional view of FIG. 4 showing various groupings of streamlines.

FIG. 9 is another closeup view of the sectional view of FIG. 4 showing various groupings of streamlines. A Range streamlines (A1*a*+A1*b*; A2*a*+A2*b*) emanate from a driver 900 of the tweeter 152 and reflect off the dispersion surface central section 122 enroute to a listener. B Range streamlines (B1*a*+B1*b*; B2*a*+B2*b*) emanate from the woofer cone 152 and reflect off the dispersion surface central section 122 enroute to a listener. C Range streamlines (C1*a*+C1*b*+C1*c*; C2*a*+C2*b*+C2*c*) emanate from the woofer cone 152, reflect off the dispersion surface surrounding section 124, and then reflect off the baffle 104 enroute to a listener.

Figure 10:
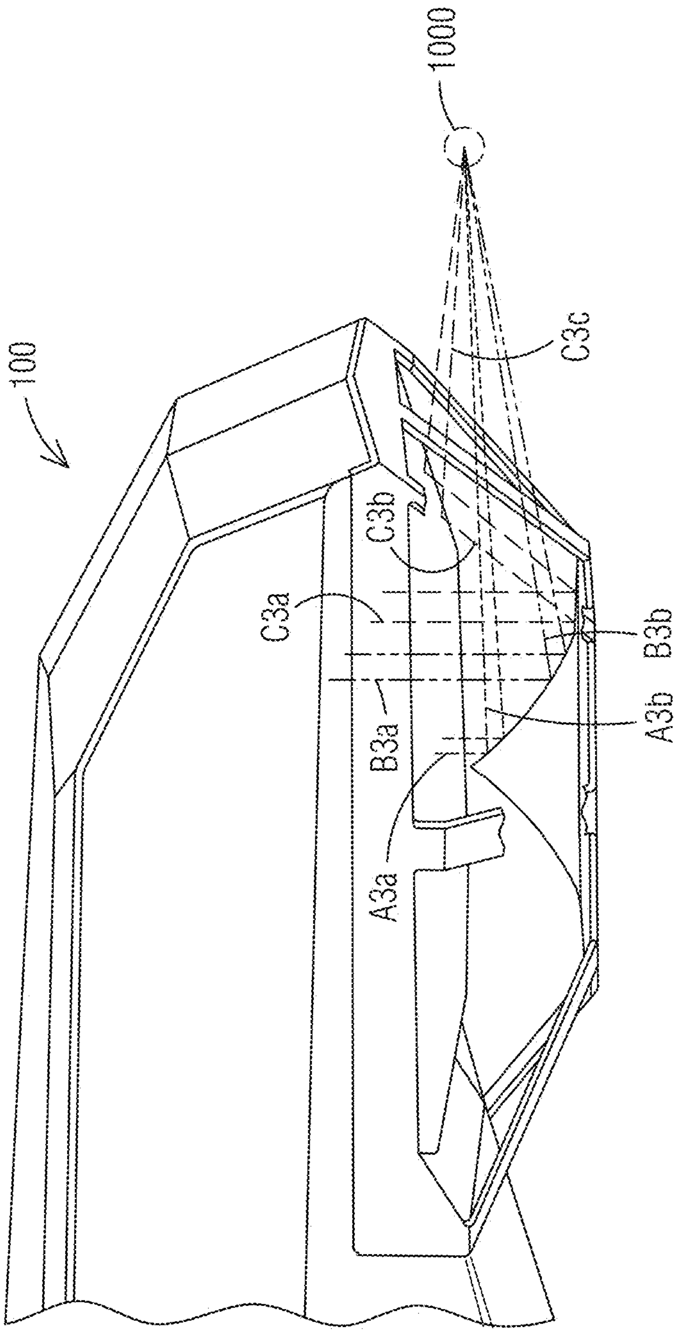
FIG. 10 is a side view of the speaker assembly of FIG. 1 showing streamlines that converge at a relatively close point in space.

FIG. 10 is a side view of the speaker assembly of FIG. 1 showing relatively short streamlines that converge at a relatively close point 1000 in space. As used herein, a streamline length starts at a point of origin (e.g., a baffle surface) and terminates at a point of convergence (such as a listener's ear). The dispersion cone 106 and the baffle 104 are configured such that a relatively short A Range streamline A3*a*+A3*b* has a relatively short A Range streamline length, a relatively short B Range streamline B3*a*+B3*b* has a relatively short B Range streamline length, and a relatively short C Range streamline C3*a*+C3*b*+C3*c* has a relatively short C Range streamline length. In the example embodiment shown, the relatively short A Range streamline length, the relatively short B Range streamline length, and the relatively short C Range streamline length are within four (4) inches of each other.

Figure 11:
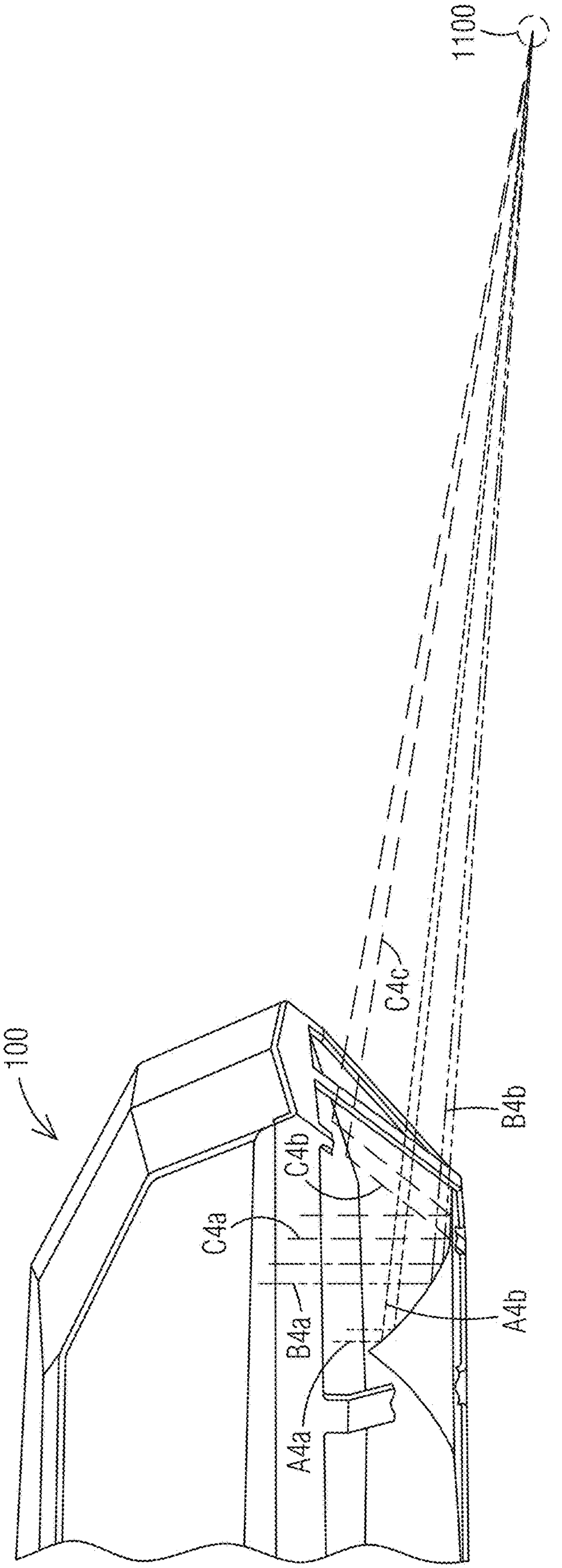
FIG. 11 is a side view of the speaker assembly of FIG. 1 showing streamlines that converge at a relatively distant point in space.

FIG. 11 is a side view of the speaker assembly of FIG. 1 showing relatively long streamlines that converge at a relatively distant point 1000 in space. The dispersion cone 106 and the baffle 104 are configured such that a relatively long A Range streamline A4*a*+A4*b* has a relatively long A Range streamline length, a relatively long B Range streamline B4*a*+B4*b* has a relatively long B Range streamline length, and a relatively long C Range streamline C4*a*+C4*b*+C4*c* has a relatively long C Range streamline length. In the example embodiment shown, the relatively long A Range streamline length, the relatively long B Range streamline length, and the relatively long C Range streamline length are within four (4) inches of each other.

In the example embodiment shown, the relatively short A Range streamline length, the relatively short B Range streamline length, and the relatively short C Range streamline length, and the relatively long A Range streamline length, the relatively long B Range streamline length, and the relatively long C Range streamline length are all within four (4) inches of each other.

In an example embodiment, for all listening points, all A Range streamline lengths are within four (4) inches of each other. In an example embodiment, for all listening points, all B Range streamline lengths are within four (4) inches of each other. In an example embodiment, for all listening points, all C Range streamline lengths are within four (4) inches of each other.

In various example embodiments, for all listening points, any two of all the A Range streamline lengths, all the B Range streamline lengths, and all the C Range streamline lengths are within four (4) inches of each other.

In an example embodiment, for all listening points, all the A Range streamline lengths, all the B Range streamline lengths, and all the C Range streamline lengths are within four (4) inches of each other.

Having the streamline lengths so close to each other throughout the sound field ensures a consistent sound experience regardless of the listener's position.

For at least the reasons disclosed herein, the dispersion cone 106 and the baffle 104 of the speaker assembly 100 provide a more uniform and superior sound presentation for listeners at various positions relative to the speaker as well as those moving relative to the speaker. Consequently, this represents an improvement in the art.

While various embodiments of the present invention have been shown and described herein, it will be obvious that such embodiments are provided by way of example only. Numerous variations, swapping of features among embodiments, changes, and substitutions may be made without departing from the invention herein. Accordingly, it is intended that the invention be limited only by the spirit and scope of the appended claims.

The invention claimed is:

1. An apparatus, comprising:

a speaker;

a baffle surrounding the speaker; and a dispersion cone positioned forward of, aligned with, and pointing toward the speaker and comprising a dispersion surface comprising: a dispersion surface central section; a dispersion surface surrounding section therearound; and a transition therebetween;

wherein from a tip of the dispersion cone outward the dispersion surface central section defines a concave cross-sectional shape, the dispersion surface surrounding section defines a less concave cross-sectional shape than the concave cross-sectional shape of the dispersion surface central section, and the transition comprises an inflection point; and wherein a distance of each section of the dispersion surface forward of the speaker progressively increases with increasing radial distance from a radial center of the dispersion surface.

2. The apparatus of claim 1, wherein the cross-sectional shape of the dispersion surface surrounding section is straight.

3. The apparatus of claim 1, wherein the dispersion surface central section is configured to redirect sound waves emanating from a central region of the speaker radially outward and between the baffle and the dispersion surface surrounding section.

4. The apparatus of claim 1, wherein the dispersion surface surrounding section is configured to redirect sound waves emanating from a peripheral region of the speaker radially outward and axially back toward the baffle surrounding the speaker.

5. The apparatus of claim 4, wherein a baffle reflecting surface of the baffle is configured to receive the sound waves redirected by the dispersion surface surrounding section and to redirect the sound waves radially outward and axially forward.

6. The apparatus of claim 5, wherein from an inner perimeter to an outer perimeter a cross-sectional shape of the baffle reflecting surface is straight.

7. The apparatus of claim 1, wherein the dispersion surface surrounding section is secured to the baffle via a plurality of ribs.

8. The apparatus of claim 1, wherein the dispersion cone further comprises a forward-facing radiating surface disposed opposite the dispersion surface, and wherein the dispersion cone is configured to act as a passive radiator to radiate sound waves impacting the dispersion surface from the forward-facing radiating surface directly to a surrounding environment.

9. The apparatus of claim 8, wherein the forward-facing radiating surface comprises:

a radiating surface central section that corresponds to the dispersion surface central section and that comprises a concave overall shape; and a radiating surface surrounding section that corresponds to the dispersion surface surrounding section.

10. The apparatus of claim 9, wherein from the tip of the dispersion cone outward the radiating surface central section defines a convex cross-sectional shape that matches the concave cross-sectional shape of the dispersion surface central section; and wherein from a radiating surface surrounding section inner perimeter outward the radiating surface surrounding section defines a cross-sectional shape that matches the cross-sectional shape of the dispersion surface surrounding section.

11. The apparatus of claim 1, wherein the speaker comprises a two-way speaker comprising a tweeter and a second speaker, wherein both the tweeter and the second speaker are disposed concentric with the dispersion cone.

12. The apparatus of claim 11, wherein the dispersion surface surrounding section is radially aligned with a surround of the speaker or a perimeter of a cone of the second speaker.

13. An apparatus, comprising:

a speaker;

a baffle surrounding the speaker; and a dispersion cone positioned forward of, aligned with, and pointing toward the speaker, wherein the dispersion cone is configured to redirect sound waves emanating from a central region of the speaker radially outward, configured to redirect sound waves emanating from a peripheral region the speaker radially outward and axially back toward the baffle surrounding the speaker, and configured to act as a passive radiator to radiate sound waves emanating from the speaker via a resonance of the dispersion cone.

14. The apparatus of claim 13, wherein the dispersion cone is held concentric with the speaker via ribs secured to a perimeter of the dispersion cone.

15. The apparatus of claim 13, wherein the dispersion cone comprises a dispersion surface comprising a dispersion surface central section, a dispersion surface surrounding section therearound, and a transition therebetween;

wherein from a tip of the dispersion cone outward the dispersion surface central section defines a concave cross-sectional shape, the dispersion surface surrounding section defines a less concave cross-sectional shape than the concave cross-sectional shape of the dispersion surface central section, and wherein the transition comprises an inflection point; and wherein the concave cross-sectional shape of the dispersion surface central section and the cross-sectional shape of the dispersion surface surrounding section both taper away from the speaker with increasing distance from a radial center of the dispersion surface.

16. The apparatus of claim 15, wherein the cross-sectional shape of the dispersion surface surrounding section is straight.

17. The apparatus of claim 15, wherein the wherein the dispersion cone comprises a radiating surface disposed opposite the dispersion surface, and wherein the radiating surface comprises:

a radiating surface central section that corresponds to the dispersion surface central section and that comprises a concave shape.

18. The apparatus of claim 17, wherein from the tip of the dispersion cone outward the radiating surface central section defines a convex cross-sectional shape that matches the concave cross-sectional shape of the dispersion surface central section.

19. The apparatus of claim 17, wherein the radiating surface further comprises radiating surface surrounding section that corresponds to the dispersion surface surrounding section and that from the tip of the dispersion cone outward defines a cross-sectional shape that matches the cross-sectional shape of the dispersion surface surrounding section.

* * * * *